(12) United States Patent
Takeuchi (10) Patent No.: US 8,467,112 B2
(45) Date of Patent: Jun. 18, 2013

(54) IMAGE READING DEVICE

(75) Inventor: Masaru Takeuchi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 309 days.

(21) Appl. No.: 12/749,311

(22) Filed: Mar. 29, 2010

(65) Prior Publication Data

US 2010/0245951 A1 Sep. 30, 2010

(30) Foreign Application Priority Data

Mar. 30, 2009 (JP) ................................. 2009-083753

(51) Int. Cl.
*H04N 1/04* (2006.01)

(52) U.S. Cl.
USPC ........... 358/498; 358/474; 358/497; 358/496; 399/367; 271/241

(58) Field of Classification Search
USPC ................. 358/498, 474, 497, 496, 486, 501, 358/482, 483; 271/241; 399/367
See application file for complete search history.

(56) References Cited

U.S. PATENT DOCUMENTS

| 5,864,408 | A | 1/1999 | Kumashiro | |
|---|---|---|---|---|
| 7,545,544 | B2 * | 6/2009 | Tanaka et al. | 358/496 |
| 7,724,405 | B2 * | 5/2010 | Kondo | 358/487 |
| 7,755,813 | B2 * | 7/2010 | Nishikawa et al. | 358/497 |
| 8,253,992 | B2 * | 8/2012 | Shoda et al. | 358/474 |
| 8,363,290 | B2 * | 1/2013 | Shinno et al. | 358/498 |
| 2005/0006839 | A1 * | 1/2005 | Oomori et al. | 271/241 |
| 2005/0206971 | A1 * | 9/2005 | Chang | 358/498 |
| 2006/0291929 | A1 | 12/2006 | Ono et al. | |

FOREIGN PATENT DOCUMENTS

| JP | S62-179271 A | 8/1987 |
|---|---|---|
| JP | S63-180650 A | 7/1988 |
| JP | H03-030568 A | 2/1991 |
| JP | H08-046742 A | 2/1996 |
| JP | H08-186687 A | 7/1996 |
| JP | H09-037020 A | 2/1997 |
| JP | 2000-236422 A | 8/2000 |
| JP | 2004-080448 A | 3/2004 |
| JP | 2005-041667 A | 2/2005 |
| JP | 2007-336278 A | 12/2007 |

OTHER PUBLICATIONS

Japan Patent Office, Decision to Grant a Patent for Japanese Patent Application No. 2009-083753 (counterpart to above-captioned patent application), mailed Nov. 8, 2011.

* cited by examiner

*Primary Examiner* — Negussie Worku
(74) *Attorney, Agent, or Firm* — Baker Botts L.L.P.

(57) ABSTRACT

An image sensor reads an image from a document sheet disposed on a document holding portion of a platen glass while the image sensor is moving along the platen glass in a predetermined direction or reads an image from a document sheet fed by a document feeder while the image sensor is stopped at the image reading position. A discharge guide member guides a document sheet which has passed the image reading position in a direction downstream from the platen glass. A sliding mechanism slides a first plate that faces the document holding portion selectively between a first position and a second position along the platen glass in a sliding direction parallel to the predetermined direction. The image reading position is within the document holding portion. The first plate, when in the first position, covers the image reading position, and the first plate, when in the second position, is separated from the image reading position.

12 Claims, 5 Drawing Sheets

IMAGE READING DEVICE

CROSS REFERENCE TO RELATED APPLICATION

This application claims priority from Japanese Patent Application No. 2009-083753, filed on Mar. 30, 2009, the entire disclosure of which is incorporated herein by reference.

BACKGROUND OF THE INVENTION

1. Field of the Invention

This application relates to an image reading device configured to read an image recorded on a sheet material, e.g., a document sheet.

2. Description of Related Art

A known reading device, e.g., a scanner, comprises a platen glass, a document cover, and an image sensor, e.g., a contact image sensor (CIS) and a charge coupled device (CCD). The platen glass has a document holding portion. The image sensor is disposed at a lower surface of the platen glass. The document cover is configured to cover a document sheet placed on the document holding portion. The known reading device further comprises an automatic document feeder (ADF) that is disposed in the document cover and is configured to take up document sheets placed on a document tray, one at a time, and automatically feed a document sheet to an image reading position.

In a flat-bed mode in which the ADF is not used, the image sensor reads an image from a document sheet placed on the document holding portion while moving along the platen glass. In an ADF mode in which the ADF is used, the image sensor reads an image from a document sheet fed by the ADF while stopping at the image reading position. The ADF comprises a transparent discharge guide member configured to guide, upward from the platen glass, a document sheet having passed the image reading position. In the ADF mode, the image sensor reads an image from the document sheet through the transparent discharge guide at the image reading position.

When the platen glass is a single glass, and the image reading position is within the document holding portion, the image sensor is configured, in the flat-bed mode, to read an image from a document sheet through the transparent discharge guide member when the image sensor passes the image reading position. In this case, if the document sheet is smaller in size than a recording sheet, the image sensor may read an extending portion of the discharge guide member from the document sheet, and the outline of the discharge guide member may appear, as black streaks, in an image read and recorded on the recording sheet. As a result, the recorded image is degraded in quality.

SUMMARY OF THE INVENTION

A need has arisen for an image reading device that overcomes these and other shortcomings of the related art, and is configured to read an image from a document sheet properly in a flat-bed mode as well as in an ADF mode so as to produce a high quality read image.

According to an embodiment of the invention, an image reading device comprises a platen glass comprising a document holding portion, a document feeder configured to feed document sheets sequentially along a conveying path to an image reading position, and an image sensor disposed at a first surface of the platen glass. The image sensor is configured to read an image from a document sheet disposed on the document holding portion while the image sensor is moving along the first surface of the platen glass in a predetermined direction or to read the image from the document sheet fed by the document feeder while the image sensor is stopped at the image reading position. The image reading device further comprises a first plate configured to face the document holding portion, and a discharge guide member configured to guide the document sheet which has passed the image reading position in a direction downstream from the platen glass, and a sliding mechanism configured to slide the first plate selectively between a first position and a second position along the platen glass in a sliding direction parallel to the predetermined direction. The image reading position is within the document holding portion. The first plate covers the image reading position when the first plate is in the first position, and the first plate is separated from the image reading position when the first plate is in the second position.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Embodiments of the invention and their features and technical advantages may be understood by referring to FIGS. 1-5, like numerals being used for like corresponding parts in the various drawings.

An image reading device 10, e.g., a scanner, comprises an image sensor configured to read an image recorded on a document sheet. Note that the present invention may be embodied as an image recording device having such a scanner function, or a multifunction device having a facsimile function in addition to the scanner function.

The image reading device 10 comprises a main body 11 and a document cover 12 that is opened and closed relative to the main body 11. That is, the document cover 12 is configured to change its orientation between an open orientation in which a platen glass 13 is exposed and a closed orientation in which the platen glass 13 is covered. The document cover 12 comprises an automatic document feeder (ADF) 30 (described below). In a flat-bed mode in which the ADF is not used, document sheets are manually fed to the main body 11 one by one by a user. In an ADF mode in which the ADF is used, document sheets are automatically and sequentially fed to the main body 11 by the ADF 30.

The main body 11 comprises a housing (not shown). The housing has an opening in the top surface, and the platen glass 13 is disposed so as to cover the opening. The platen glass 13 has document frame portions 15, 16 defined at the periphery of the top surface 20 of the platen glass 13, and a document holding portion 14 defined by and enclosed by the document frame portions 15, 16. In the flat-bed mode, a document sheet is placed on the document holding portion 14 and an image is read from the document sheet.

Figure 1:
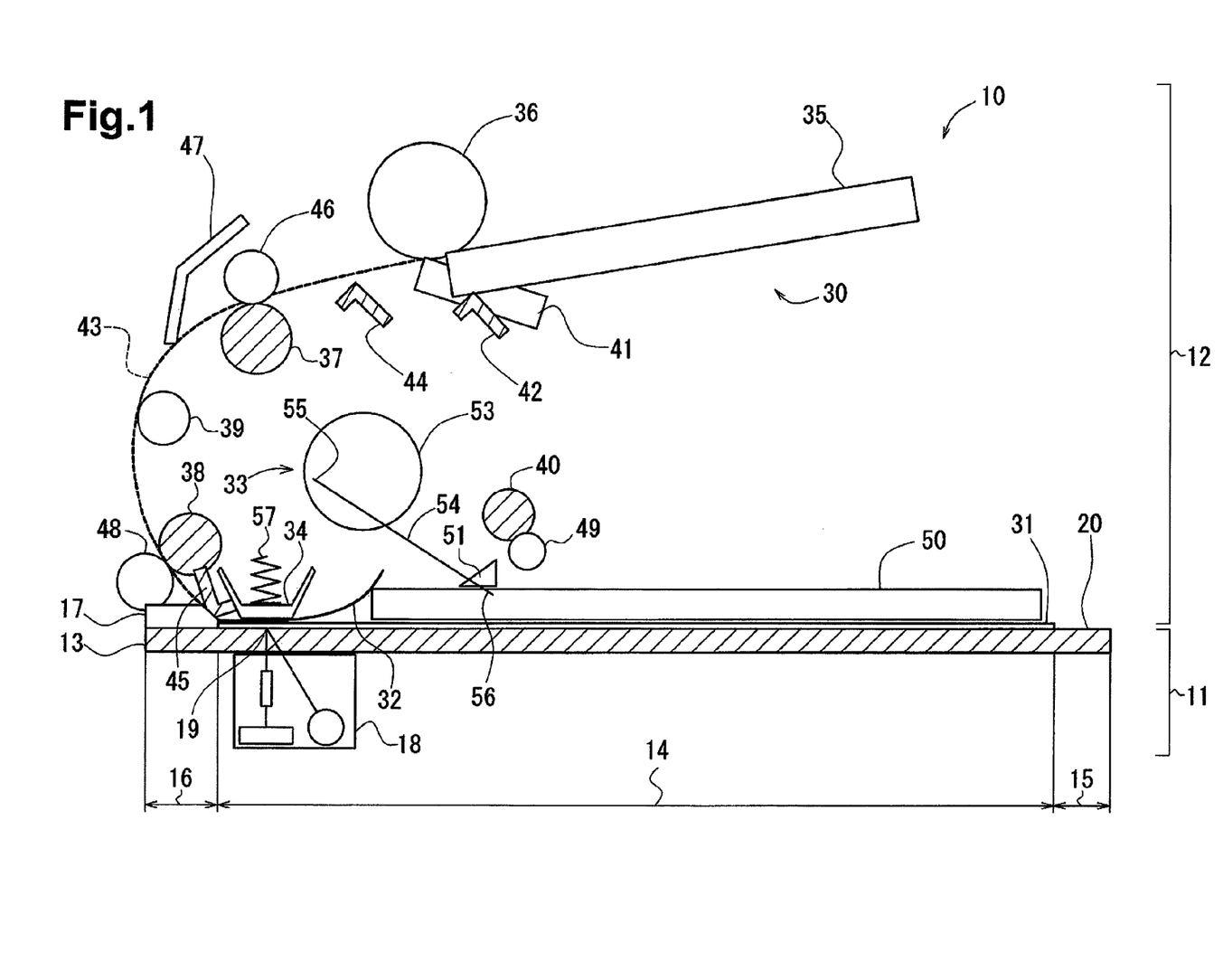
FIG. 1 is a schematic drawing of an image reading device in which a first plate is in a first position, according to an embodiment of the invention.

A positioning plate 17 is disposed on the document frame portion 16 of the platen glass 13. As shown in FIG. 1, the positioning plate 17 is a thin flat plate and extends in a direction perpendicular to the sheet plane of FIG. 1. The positioning plate 17 defines an edge of the document holding portion 14. When a document sheet is manually fed, the document sheet is abutted against the positioning plate 17. Thus, the document sheet is placed in the document holding portion 14 with its edge aligned with respect to the positioning plate 17. An image reading position 19 is set within the document holding portion 14, at a position on an inner side of the edge of the document holding portion 14 defined by the positioning plate 17, i.e., at a position on the right side of the positioning plate 17 in FIG. 1. In the ADF mode, a contact image sensor (CIS) 18 reads an image from a document sheet automatically fed by the ADF 30 while stopping at the image reading position 19.

The main body 11 comprises the CIS 18. The CIS 18 is an image sensor configured to read an image recorded on a document sheet. Because the structure of the CIS 18 is known, descriptions of the principles and operations thereof will be omitted. As shown in FIG. 1, the CIS 18 is disposed near the platen glass 13 and on a lower side of the platen glass 13. The CIS 18 is driven by a predetermined driving mechanism to move along the platen glass 13, in a predetermined direction, e.g., in left-to-right and right-to-left directions in FIG. 1.

When a document sheet is manually fed in the flat-bed mode, the document sheet is placed on the document holding portion 14 of the platen glass 13. Then, the CIS 18 moves along the platen glass 13 in the predetermined direction to scan an image recorded on the document sheet. The CIS 18 is driven by a driving mechanism having a known structure comprising, for example, a drive motor and a pulley-belt mechanism. When document sheets are automatically fed in the ADF mode, the CIS 18 moves to and stops at the image reading position 19. As will be described in detail below, the CIS 18 scans an image of a document sheet passing the image reading position 19.

The document cover 12 comprises a cover body (not shown). The ADF 30, a first plate 31, a second plate 34, a discharge guide member 32, and a sliding mechanism 33 for sliding the first plate 31 are disposed in the cover body which serves as a frame.

The ADF 30 comprises a document tray 35, a feed roller 36, a first convey roller 37, a second convey roller 38, an auxiliary roller 39 disposed between the first convey roller 37 and the second convey roller 38, and a discharge roller 40. The document tray 35 is configured to accommodate a plurality of document sheets. The feed roller 36 takes up the document sheets one by one from the document tray 35. A separation member 41 is disposed so as to oppose the feed roller 36. The separation member 41 is made of, for example, a cork member. Even if a plurality of document sheets enter the nip between the feed roller 36 and the separation member 41, one document sheet is assuredly separated from the rest because of a sufficient friction force generated between the separation member 41 and the document sheets. A separation sensor 42 is provided near the feed roller 36. The separation sensor 42 detects that one document sheet has been taken up from the document tray 35.

The document sheet taken up from the document tray 35 passes the first convey roller 37, the auxiliary roller 39, and the second convey roller 38, and is conveyed along the platen glass 13. Then, as will be described below, the document sheet is directed upward so as to be separated from the platen glass 13 and is discharged by the discharge roller 40. That is, the document sheet is conveyed so as to make a U-turn along a conveying path 43 indicated by a dashed line in FIG. 1. The document sheet discharged by the discharge roller 40 is received by a discharge tray (not shown). The feed roller 36 is disposed above the discharge roller 40. As shown in FIG. 1, a first sheet sensor 44 is disposed on the upstream side of the conveying path 43, and a second sheet sensor 45 is disposed on the downstream side of the conveying path 43. The first sheet sensor 44 is disposed near and upstream of the first convey roller 37 in a document conveying direction. The first sheet sensor 44 detects an edge of the document sheet taken up from the document tray 35. The second sheet sensor 45 is disposed near and downstream of the second convey roller 38 in the document conveying direction. The second sheet sensor 45 detects an edge of the document sheet after the edge of the document sheet have passed the second convey roller 38.

The auxiliary roller 39 abuts against the document sheet conveyed along the curved conveying path 43 to facilitate smooth conveyance of the document sheet. Although not illustrated, the conveying path 43 is defined by a guide plate provided on the cover body.

The first convey roller 37 pinches the document sheet against a pinch roller 46 and conveys the document sheet in the document conveying direction. In this embodiment, the feed roller 36 and the pinch roller 46 are attached to a sub-frame 47, which can be opened and closed relative to the cover body. When the sub-frame 47 is closed, as shown in FIG. 1, the feed roller 36 and the separation member 41 make a pair, and the pinch roller 46 and the first convey roller 37 make a pair. When the sub-frame 47 is opened, the feed roller 36 is separated from the separation member 41, and the pinch roller 46 is separated from the first convey roller 37. This configuration eases removal of a jammed document sheet.

The second convey roller 38 pinches the document sheet against the pinch roller 48 and conveys the document sheet in the document conveying direction. The discharge roller 40 pinches the document sheet against pinch roller 49 and conveys the document sheet directed upward from the platen glass toward the discharge tray.

The first plate 31 is disposed at the lower surface of the cover body and configured to face the document holding portion 14 of the platen glass 13 when the document cover 12 is closed. A surface of the first plate 31 facing the document holding portion 14 may be white. The first plate 31 has such a size as to cover the entirety of the document holding portion 14. In this case, when the document sheet is manually placed on the platen glass 13 and the document cover 12 is closed, the first plate 31 completely covers the placed document sheet as well as the document holding portion 14.

In this embodiment, the first plate 31 comprises a support frame 50. The support frame 50 is attached to the cover body. The first plate 31 is disposed at the lower surface of the support frame 50. The support frame 50 comprises a guide member 51. The guide member 51 guides the document sheet toward the discharge roller 40 while the document sheet abuts against the guide member 51.

The discharge guide member 32 is attached to the first plate 31. More specifically, the discharge guide member 32 is disposed at an upstream edge side of the first plate 31 in the document conveying direction. As shown in FIG. 1, the discharge guide member 32 is curved upward, i.e., toward a direction away from the platen glass 13, and guides the document sheet which has passed the image reading position 19 in the downstream direction from the platen glass 13. In this embodiment, the discharge guide member 32 comprises a transparent resin film and extends in a direction perpendicular to the sheet plane of FIG. 1. The discharge guide member 32 directs upward toward the discharge roller 40 the document sheet conveyed by the second conveying roller 38 and having passed the image reading position 19.

The sliding mechanism 33 comprises a roller 53 and a connecting rod 54. The roller 53 rotates about a rotation shaft (not shown). The rotation shaft of the rotary roller 53 is disposed parallel to the rotation shafts of the feed roller 36 and the conveying rollers 37, 38. The roller 53 is driven by a predetermined drive motor via a drive force transmitting mechanism (not shown). The roller 53 may be driven by a drive motor for driving the feed roller 36 and the conveying rollers 37, 38.

The support frame 50 that supports the first plate 31 is configured to slide along the moving direction of the CIS 18, i.e., in the left-to-right and right-to-left directions in FIG. 1 relative to the cover body. More specifically, the cover body may have a slide rail extending along the moving direction of the CIS 18, and the support frame 50 may engage with the slide rail. In this case, the support frame 50 as a slider slides on the slide rail as a slide base along the moving direction of the CIS 18.

One end 55 of the connecting rod 54 is connected to the roller 53, and the other end 56 of the connecting rod 54 is connected to the support frame 50. The one end 55 of the connecting rod 54 rotates around the rotation shaft as the roller 53 rotates. The other end 56 of the connecting rod 54 moves as the roller 53 rotates. Because the other end 56 of the connecting rod 54 is connected to the support frame 50, the support frame 50 slides in the left-to-right and right-to-left directions in FIG. 1. In other words, the sliding mechanism 33 comprises a crank mechanism that converts rotational movement of the roller 53 to reciprocal sliding movement of the support frame 50. The connecting rod 54 connected to the support frame 50 allows the first plate 31 to have a small thickness. This is because, if the support frame 50 is not provided, a connecting portion for connecting the connecting rod 54 needs to be provided on the first plate 31.

The sliding mechanism 33 slides the support frame 50 and the first plate 31 in response to the rotation of the feed roller 36 and the conveying rollers 37, 38. The sliding mechanism 33 slides the support frame 50 and the first plate 31 between a first position (FIGS. 1, 2, and 5) and a second position (FIGS. 3 and 4) along the platen glass 13, parallel to the moving direction of the CIS 18. The second position is shifted to the right from the first position. When the support frame 50 and the first plate 31 move from the second position to the first position, the first plate 31 moves toward the positioning plate to cover the image reading position 19. When the support frame 50 and the first plate 31 move from the first position to the second position, the first plate moves away from the positioning plate 17 to separate from the image reading position 19 so as to allow the document sheet to advance to the image reading position 19.

The second plate 34 is disposed at the lower surface of the cover body. The second plate 34 is positioned at the image reading position 19. When the first plate 31 is in the first position, the first plate 31 and the discharge guide member 32 are disposed at a position between the second plate 34 and the platen glass 13. When the first plate 31 is in the second position, the first plate 31 and the discharge guide member 32 are distal to the position between the second plate 34 and the platen glass 13, and the second plate 34 is exposed to the lower surface of the cover body and directly faces the platen glass 13. A surface of the second plate 34 facing the platen glass 13 may be white. In the ADF 30 mode, a document sheet is automatically fed by the ADF 30 to the image reading position 19 on the platen glass 13. The second plate 34 extends along a dimension of the document holding portion 14 in a direction perpendicular to the moving direction of the CIS, i.e., in a direction perpendicular to the sheet plane of FIG. 1, and overlies the document sheet passing the image reading position 19.

In this embodiment, the second plate 34 is disposed in the cover body via an elastic member 57, e.g., a coil spring. When the document cover 12 is closed, the second plate 34 is urged against the platen glass 13 by a constant urging force.

Next, an operation of the image reading device 10 will be described. FIGS. 2 to 5 schematically show the sequence of automatic feeding of a document sheet by the ADF 30.

In the flat-bed mode in which a user places a document sheet on the platen glass 13 one by one, the document cover 12 is closed and thereby the first plate 31 covers the document sheet. In this state, the CIS 18 moves to the predetermined direction, i.e., in the left-to-right direction in FIG. 1. The CIS 18, while moving, reads an image recorded on the document sheet.

Figure 2:
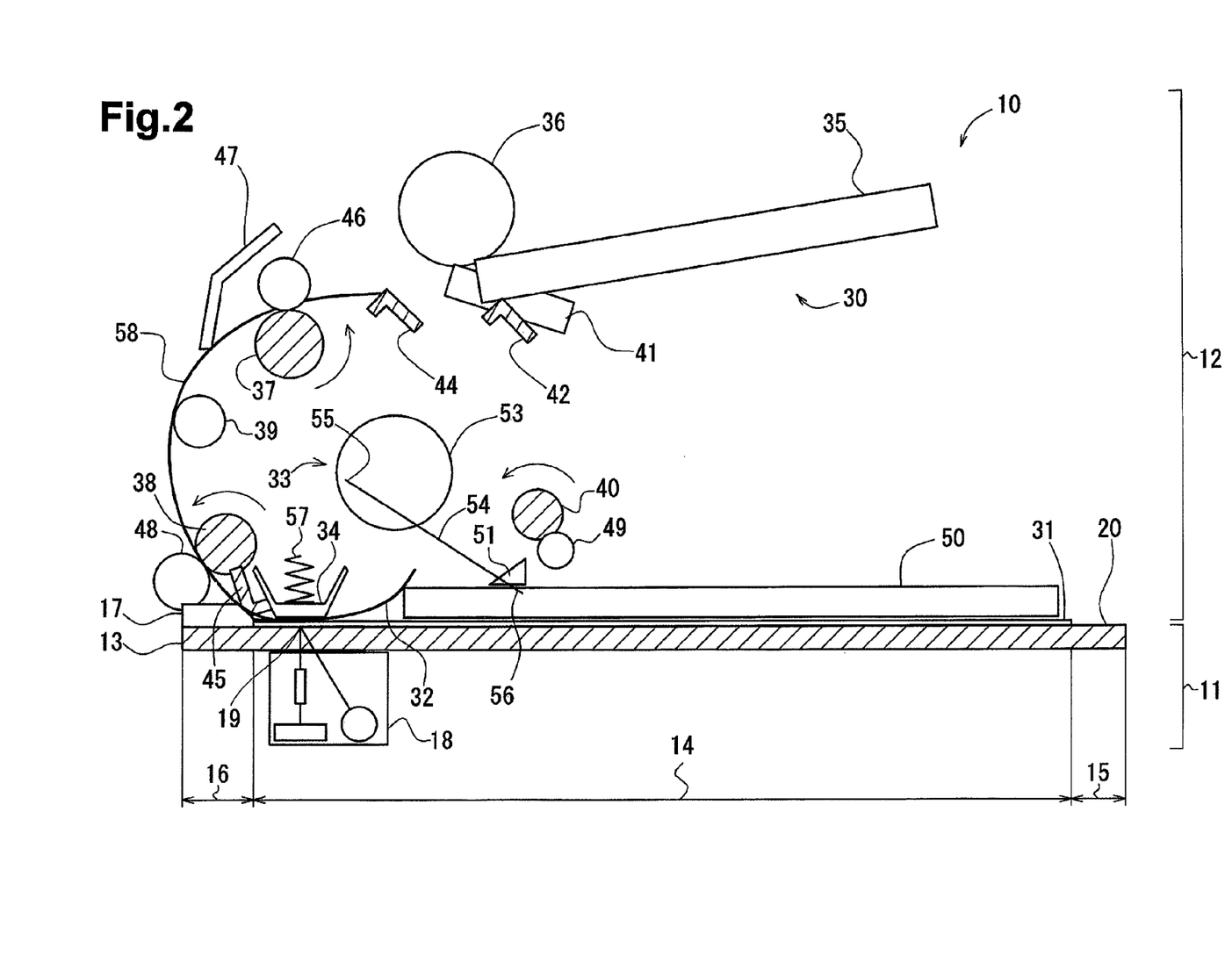
FIG. 2 is a schematic drawing of the image reading device in which a document sheet is automatically fed toward an image reading position when the first plate is in the first position.

As shown in FIG. 2, In the ADF mode in which the ADF 30 automatically feeds a plurality of document sheets, a topmost document sheet 58 on the document tray 35 is conveyed in the document conveying direction. More specifically, the topmost document sheet 58 is separated from the rest of the document sheets by the feed roller 36 and the separation member 41. The separation sensor 42 detects separation of a single document sheet 58. It may be configured such that an error indication may be presented, if two or more document sheets 58 are fed from the document tray 35.

The first sheet sensor 44 detects a leading edge of the document sheet 58 being conveyed. This indicates that the leading edge of the document sheet 58 has passed the first sheet sensor 44. The document sheet 58 is nipped by the first conveying roller 37 and the pinch roller 46 and is conveyed along the conveying path 43 by the first conveying roller 37. The rotation amount of the first conveying roller 37 is detected by a rotary encoder (not shown). The conveying distance of the document sheet 58 is obtained based on the rotation amount of the first conveying roller 37 detected by the rotary encoder.

The document sheet 58 conveyed by the first conveying roller 37 passes the auxiliary roller 39 and is nipped by the second conveying roller 38 and the pinch roller 48. The document sheet 58 is conveyed further in the document conveying direction by the second conveying roller 38 and approaches the platen glass 13. More specifically, the leading edge of the document sheet 58 reaches a corner of the positioning plate 17 on the platen glass 13. The second sheet sensor 45 is positioned downstream of the second conveying roller 38 and upstream of the image reading position 19 in the document conveying direction, and detects the leading edge of the document sheet 58 that has reached the positioning plate 17.

The rotary roller 53 is driven in response to a detection signal of the second sheet sensor 45. As has been described above, the roller 53 may be driven by the motor for driving the conveying roller 38 via the drive force transmitting mechanism (not shown). A predetermined clutch may be employed such that the motor for driving the conveying roller 38 drives the roller 53 in response to the detection signal of the second sheet sensor 45.

Figure 3:
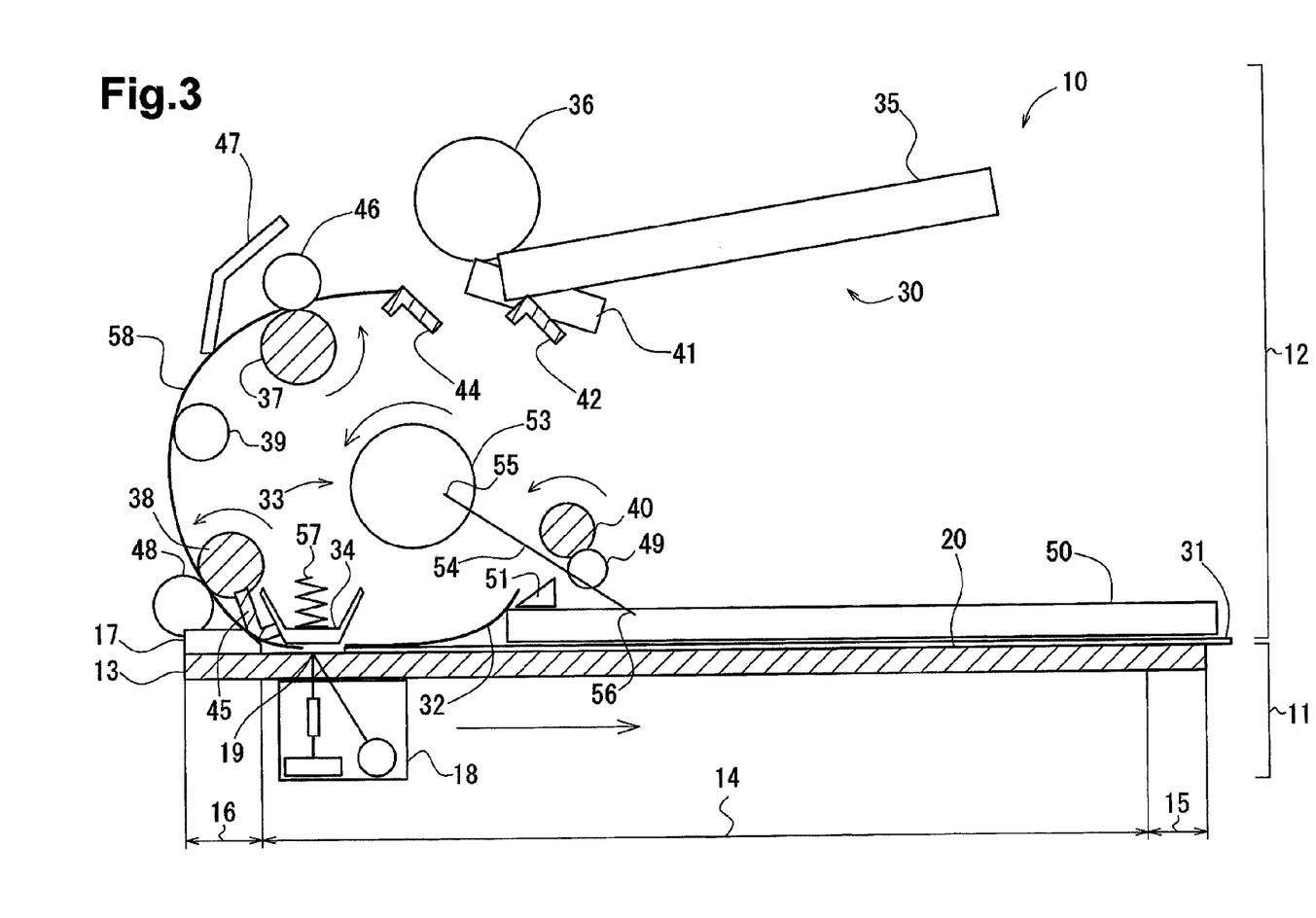
FIG. 3 is a schematic drawing of the image reading device in which the document sheet approaches the image reading position when the first plate is in a second position.

The second conveying roller 38 rotates to further convey the document sheet 58 toward the image reading position 19 and to move, via the sliding mechanism 33, the first plate 31 and the discharge guide member 32 from the first position to the second position, via the sliding mechanism 33. As shown in FIG. 3, the first plate 31 and the discharge guide member 32 slide and retract from the image reading position 19, and allow the document sheet 58 to advance to image reading position 19. At this time, the retracting speed (sliding speed) of the first plate 31 and the discharge guide member 32 may be set in correspondence with the advancing speed of the document sheet 58 by appropriately selecting the gear ratio of the drive force transmitting mechanism. In this case, because the first plate 31 and the discharge guide member 32 retract as the document sheet 58 is conveyed, noise may be eliminated or reduced during image reading.

When the first plate 31 and the discharge guide member 32 retract from the image reading position 19, the second plate 34 is exposed to the lower surface of the document cover 12. Because the second plate 34 is disposed right above the image reading position 19, the document sheet 58 enters between the second plate 34 and the platen glass 13 when advancing to the image reading position 19. When the document sheet 58 passes the image reading position 19, the CIS 18 reads an image recorded on the document sheet 58.

Figure 4:
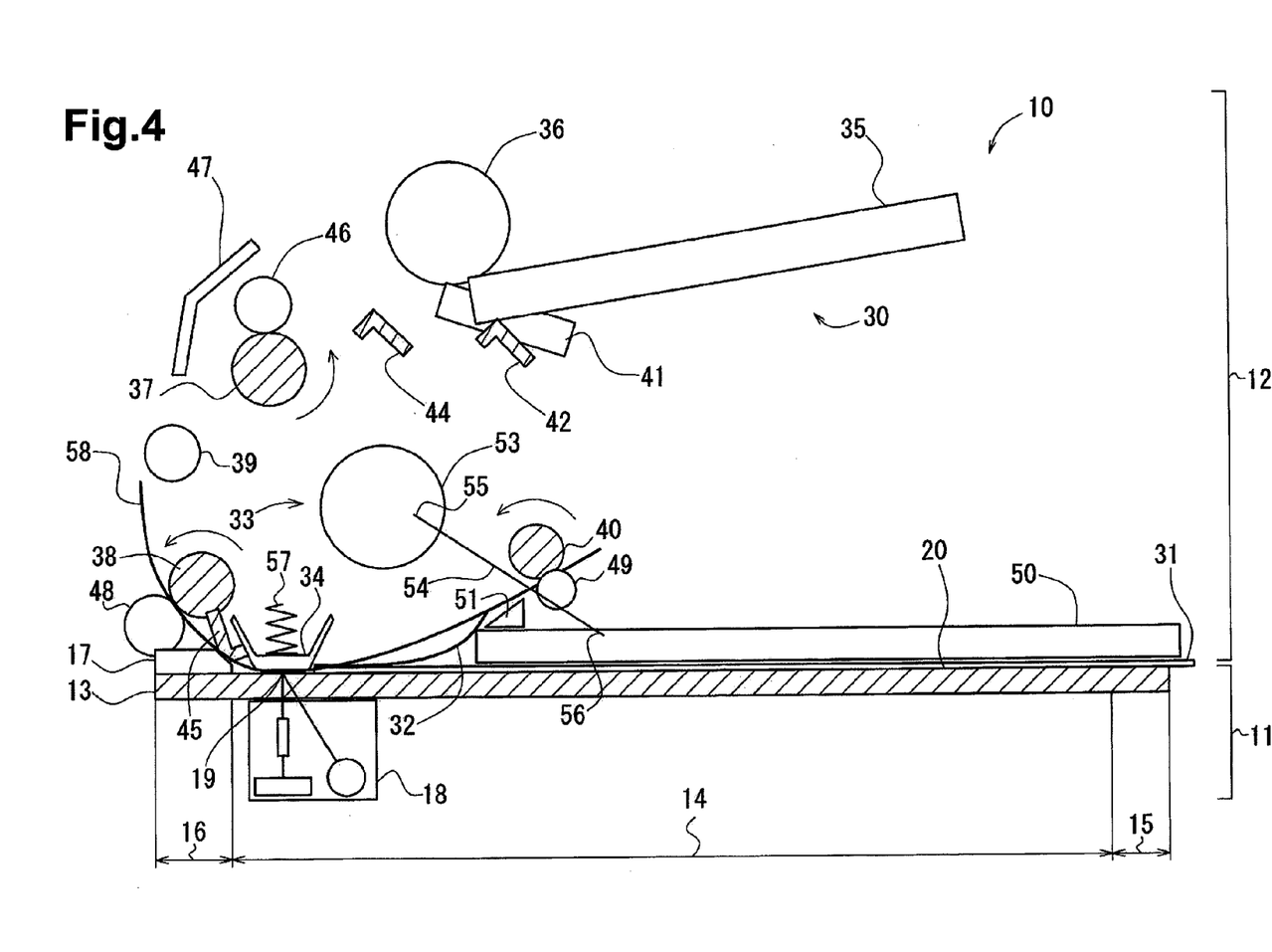
FIG. 4 is a schematic drawing of the image reading device in which the document sheet is discharged along a discharge guide member when the first plate is in the second position.
Figure 5:
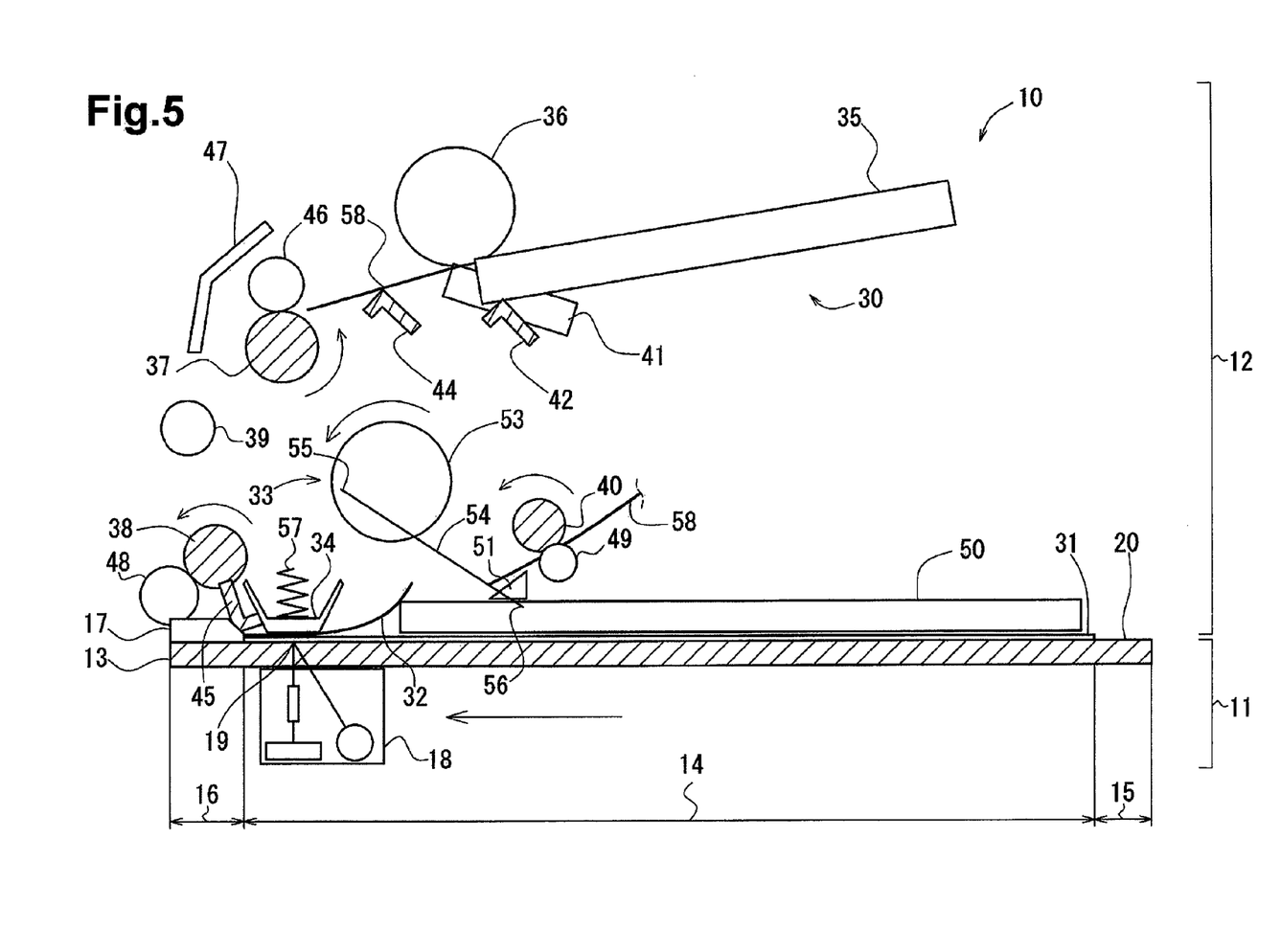
FIG. 5 is a schematic drawing of the image reading device in which the first plate is back in the first position.

As shown in FIG. 4, the document sheet 58 having passed the image reading position 19 is directed upward by the discharge guide member 32 so as to be separated from the platen glass 13. The discharge roller 40 is disposed downstream of the discharge guide member 32 in the document conveying direction, and the document sheet 58 directed upward by the discharge guide member 32 is discharged by the discharge roller 40 and the pinch roller 49, as shown in FIG. 5.

As has been described, when the document sheet 58 is discharged, the sliding mechanism 33 returns the first plate 31 and the discharge guide member 32 from the second position to the first position. The first plate 31 and the discharge guide member 32 may be controlled to return to the first position when the document sheet 58 is conveyed by a predetermined distance after the second sheet sensor 45 detects a trailing edge of the document sheet 58. Then, in the same way, the ADF 30 conveys another document sheet to the image reading position 19, and the CIS 18 reads an image recorded on the document sheet.

As has been described, in the image reading device 10 according to this embodiment, the image reading position 19 in which the CIS 18 reads an image from a document sheet automatically fed in the ADF mode is set within the document holding portion 14 of the platen glass 13. A document sheet is placed manually on the document holding portion 14 in the flat-bed mode. In this case, the platen glass 13 may be a single platen glass. This configuration allows the platen glass 13 to be a single platen glass. As compared with a case where the image reading position and the document holding portion are provided on the platen glass separately without overlapping each other, the size of the document reading device 10 may be reduced. In addition, the first plate 31 for covering the a document sheet placed on the document holding portion 14 and the second plate 34 for covering a document sheet passing the image reading position 19 are selectively used depending on either one of the flat-bed mode and the ADF mode is used.

Accordingly, quality of an image read from a document sheet may be stabilized and improved, in both flat-bed mode and ADF mode.

In this embodiment, because the sliding mechanism 33 comprises a crank mechanism, sliding the first plate 31 and the discharge guide member 32 may be readily implemented without increasing the cost or complexity of the document reading device 10. In addition, because the discharge guide member 32 comprises a resin film, the thickness of the document cover 12 may be reduced.

The sliding mechanism 33 may comprises a rack and pinion mechanism, instead of a crank mechanism, such that the support frame 50 slides between the first position and the second position via a rack as a pinion connected to a drive motor rotates.

Although, in the above described embodiment, the first plate 31 has such a size to cover the image holding portion 14 entirely, the first plate 31 may have a cut-out portion corresponding to a predetermined smallest size of a document sheet to be placed on the document holding portion 14. In this case, when a document sheet greater than or equal to the smallest size is placed on the document holding portion 14, the first plate 31 and the placed document sheet cover the document holding portion 14 entirely and prevent other members, e.g., the discharge guide member 32, from exposing to the document holding portion 14 of the platen glass 13.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image reading device comprising:
   a platen glass comprising a document holding portion;
   a document tray configured to hold document sheets;
   a document feeder configured to feed the document sheets sequentially from the document tray along a conveying path to an image reading position;
   an image sensor configured to operate selectively in a first mode, in which the image sensor moves along the platen glass in an image sensor moving direction and reads an image from a document sheet disposed on the document holding portion, and in a second mode, in which the image sensor is stopped at the image reading position and reads ran image from a document sheet fed by the document feeder;
   a first plate configured to face the document holding portion;
   a discharge guide member configured to guide the document sheet fed by the document feeder in a direction downstream from the image reading position; and
   a sliding mechanism configured to slide the first plate between the document tray and the platen glass relative to the document feeder, the document tray, and the platen glass, from a first position to a second position along the platen glass in a sliding direction parallel to the image sensor moving direction, such that,
   the first plate covers the image reading position when the first plate is in the first position, and the first plate is separated from the image reading position in the sliding direction parallel to the image sensor moving direction when the first plate is in the second position, wherein the image sensor is configured to operate in the first mode, when the first plate is in the first position, and to operate in the second mode, when the first plate is in the second position.

2. The image reading device according to claim 1, further comprising a positioning plate disposed on the platen glass, the positioning plate defines a portion of the document holding portion, wherein the first plate moves toward the positioning plate to cover the image reading position when the sliding mechanism slides the first plate from the second position to the first position, and the first plate moves away from the positioning plate to separate from the image reading position when the sliding mechanism slides the first plate from the first position to the second position.

3. The image reading device according to claim 1, further comprising a second plate positioned at the image reading position, wherein the discharge guide member is attached to the first plate, and the first plate and the discharge guide member are disposed at a position between the second plate and the platen glass when the first plate is in the first position, and the first plate and the discharge guide member are distal to the position between the second plate and the platen glass when the first plate is in the second position.

4. The image reading device according to claim 3, further comprising a document cover configured to cover the document holding portion when the document cover is in a closed position and is proximate to the platen glass, wherein the document cover comprises the document tray, the document feeder, the first plate, the second plate, the discharge guide member, and the sliding mechanism.

5. The image reading device according to claim 3, wherein each of the first plate and the second plate comprises a white surface facing the platen glass.

6. The image reading device according to claim 1, wherein the first plate covers the document holding portion entirely when the first plate is in the first position.

7. The image reading device according to claim 1, wherein the document feeder comprises a conveying roller configured to convey the document sheet to the image reading position, and wherein the sliding mechanism comprises a crank mechanism comprising:
   a rotary member configured to rotate in response to the rotation of the conveying roller, and
   a connecting member that connects the rotary member to the first plate,
   wherein the crank mechanism is configured to convert a rotational movement of the rotary member to a sliding movement of the first plate in the sliding direction.

8. The image reading device according to claim 7, further comprising a sheet sensor disposed in the conveying path downstream of the conveying roller and upstream of the image reading position, wherein the rotary member rotates in response to rotating the conveying roller when the sheet sensor detects a leading edge of the document sheet conveyed along the conveying path.

9. The image reading device according to claim 1, further comprising a sheet sensor disposed in the conveying path upstream of the image reading position, wherein the sliding mechanism is configured to slide the first plate from the first position to the second position when the sheet sensor detects a leading edge of the document sheet conveyed along the conveying path, and to slide the first plate from the second position to the first position when the sheet sensor detects a trailing edge of the document sheet.

10. The image reading device according to claim 7, wherein the first plate comprises a support frame to which the connecting member is connected, and wherein the support frame is disposed on a side of the first plate opposite to the platen glass.

11. The image reading device according to claim 1, wherein the discharge guide member comprises a resin film.

12. The image reading device according to claim 1, wherein the image sensor is configured to read the image from the document sheet disposed on the document holding portion through the platen glass in the first mode, and to read the image from the document sheet fed by the document feeder through the platen glass in the second mode.

* * * * *